United States Patent
Khalil et al.

(10) Patent No.: US 9,628,282 B2
(45) Date of Patent: Apr. 18, 2017

(54) UNIVERSAL ANONYMOUS CROSS-SITE AUTHENTICATION

(71) Applicant: Verizon Patent and Licensing Inc., Arlington, VA (US)

(72) Inventors: Manah M. Khalil, Coppell, TX (US); Siddharth Pandey, Irving, TX (US); Michael R. Lamison, Tampa, FL (US); Ashok Kumar, Flower Mound, TX (US); Sunil D. Limbasia, Irving, TX (US); Vijaya R. Challa, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 162 days.

(21) Appl. No.: 14/511,874

(22) Filed: Oct. 10, 2014

(65) Prior Publication Data
US 2016/0105290 A1    Apr. 14, 2016

(51) Int. Cl.
*H04L 29/06* (2006.01)
*H04L 9/32* (2006.01)

(52) U.S. Cl.
CPC .......... *H04L 9/3271* (2013.01); *H04L 9/3239* (2013.01); *H04L 9/3247* (2013.01); *H04L 63/0421* (2013.01); *H04L 63/0435* (2013.01); *H04L 63/08* (2013.01); *H04L 63/12* (2013.01)

(58) Field of Classification Search
CPC ...... G06F 21/30; H04L 9/0813; H04L 63/205
USPC ..... 713/183, 155; 726/5, 3, 6, 7, 8; 709/228
See application file for complete search history.

(56) References Cited

U.S. PATENT DOCUMENTS

| | | | | |
|---|---|---|---|---|
| 7,370,351 B1 * | 5/2008 | Ramachandran | ....... | H04L 63/08 726/4 |
| 7,657,531 B2 * | 2/2010 | Bisbee | .......... | G06F 21/33 707/783 |
| 7,813,822 B1 * | 10/2010 | Hoffberg | .......... | G06K 9/00369 381/73.1 |
| 7,941,834 B2 * | 5/2011 | Beck | ............ | H04L 63/083 726/6 |

(Continued)

OTHER PUBLICATIONS

Bank of America, "SiteKey Security from Bank of America: What is SiteKey?" https://www.bankofamerica.com/privacy/online-mobile-banking-privacy/sitekey.go, Oct. 7, 2012, 1 page.

*Primary Examiner* — Dede Zecher
*Assistant Examiner* — Viral Lakhia

(57) ABSTRACT

The device may receive user information associated with a user. The device may generate a user profile for the user that stores user information and authentication confirmation information. The device may provide a particular cryptographic key and information identifying the user profile. The device may receive a request to authenticate a secure session for a user device from an application server. The device may obtain, based on the user identifier, the authentication confirmation information associated with the user from a data structure storing one or more user profiles. The device may validate the particular response to the particular challenge code based on the authentication confirmation information. The device may provide information to the application server indicating that the secure session is validated for the user device based on validating the authentication information.

20 Claims, 19 Drawing Sheets

100 ⟶

(56) References Cited

U.S. PATENT DOCUMENTS

| | | | |
|---|---|---|---|
| 8,005,965 B2 * | 8/2011 | Williams | H04L 63/08 709/224 |
| 8,015,594 B2 * | 9/2011 | Salowey | H04L 63/08 713/168 |
| 8,316,237 B1 * | 11/2012 | Felsher | H04L 9/0825 380/282 |
| 8,332,920 B2 * | 12/2012 | Kass | G06F 21/33 709/203 |
| 8,600,830 B2 * | 12/2013 | Hoffberg | G06Q 30/0207 705/14.71 |
| 8,607,316 B2 * | 12/2013 | Montemurro | H04L 9/321 713/168 |
| 8,904,506 B1 * | 12/2014 | Canavor | G06F 17/30 713/182 |
| 8,973,122 B2 * | 3/2015 | Beck | G06F 21/34 380/270 |
| 9,009,469 B2 * | 4/2015 | Dittrich | G06F 21/45 713/165 |
| 9,032,490 B1 * | 5/2015 | Khitrenovich | H04L 63/08 709/238 |
| 9,112,842 B1 * | 8/2015 | Gallagher, III | G06F 21/33 |
| 9,137,723 B2 * | 9/2015 | Maguire | H04W 36/18 |
| 9,300,644 B1 * | 3/2016 | Dubey | H04L 63/08 |
| 2007/0274489 A1 * | 11/2007 | Yamamura | H04M 3/42008 379/201.1 |
| 2008/0034216 A1 * | 2/2008 | Law | H04L 9/3273 713/183 |
| 2009/0204808 A1 * | 8/2009 | Guo | G06F 21/33 713/155 |
| 2011/0047606 A1 * | 2/2011 | Blomquist | G06F 21/41 726/7 |
| 2011/0107407 A1 * | 5/2011 | Ganesan | G06F 21/33 726/6 |
| 2011/0197266 A1 * | 8/2011 | Chu | H04L 9/3228 726/5 |
| 2013/0159021 A1 * | 6/2013 | Felsher | G06F 19/322 705/3 |
| 2013/0254850 A1 * | 9/2013 | Alison | H04W 4/206 726/4 |
| 2014/0096215 A1 * | 4/2014 | Hessler | H04L 63/0869 726/7 |
| 2014/0196129 A1 * | 7/2014 | Amin | H04L 63/08 726/6 |

* cited by examiner

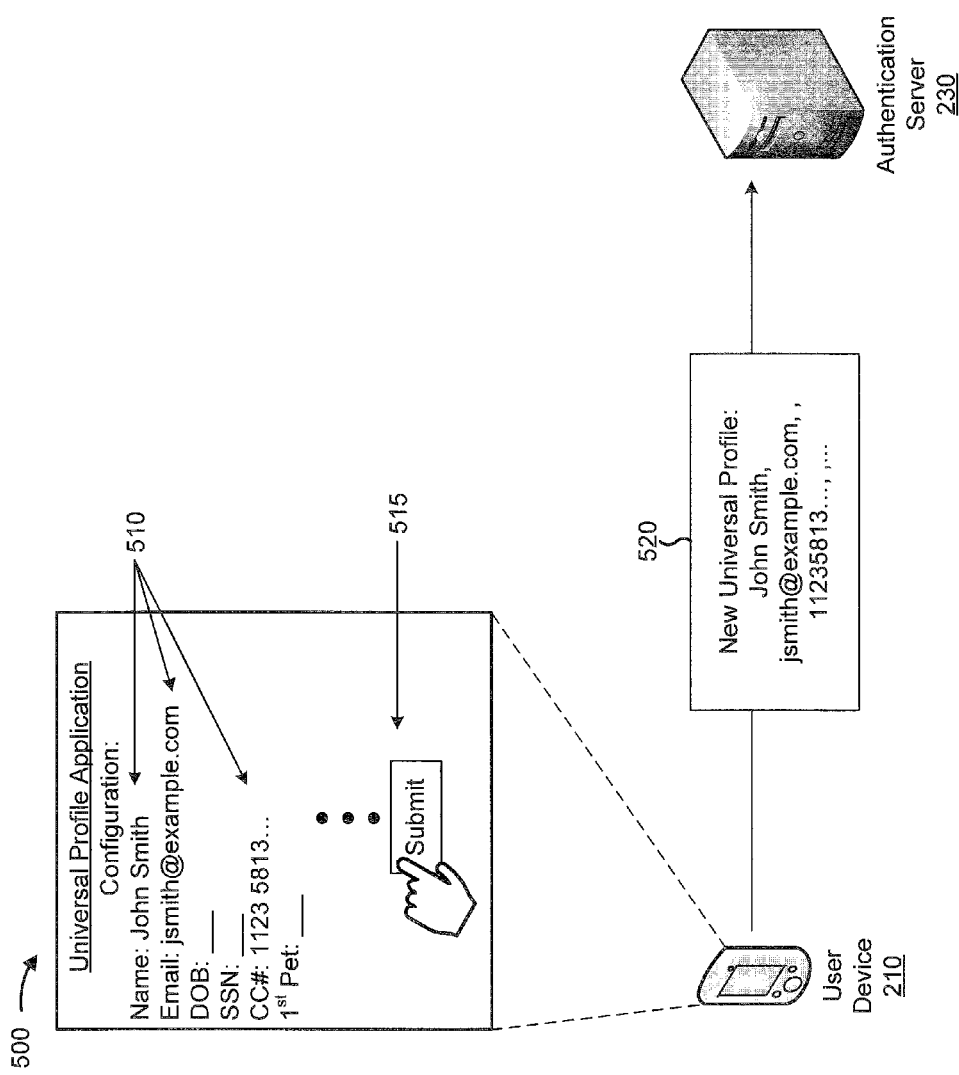

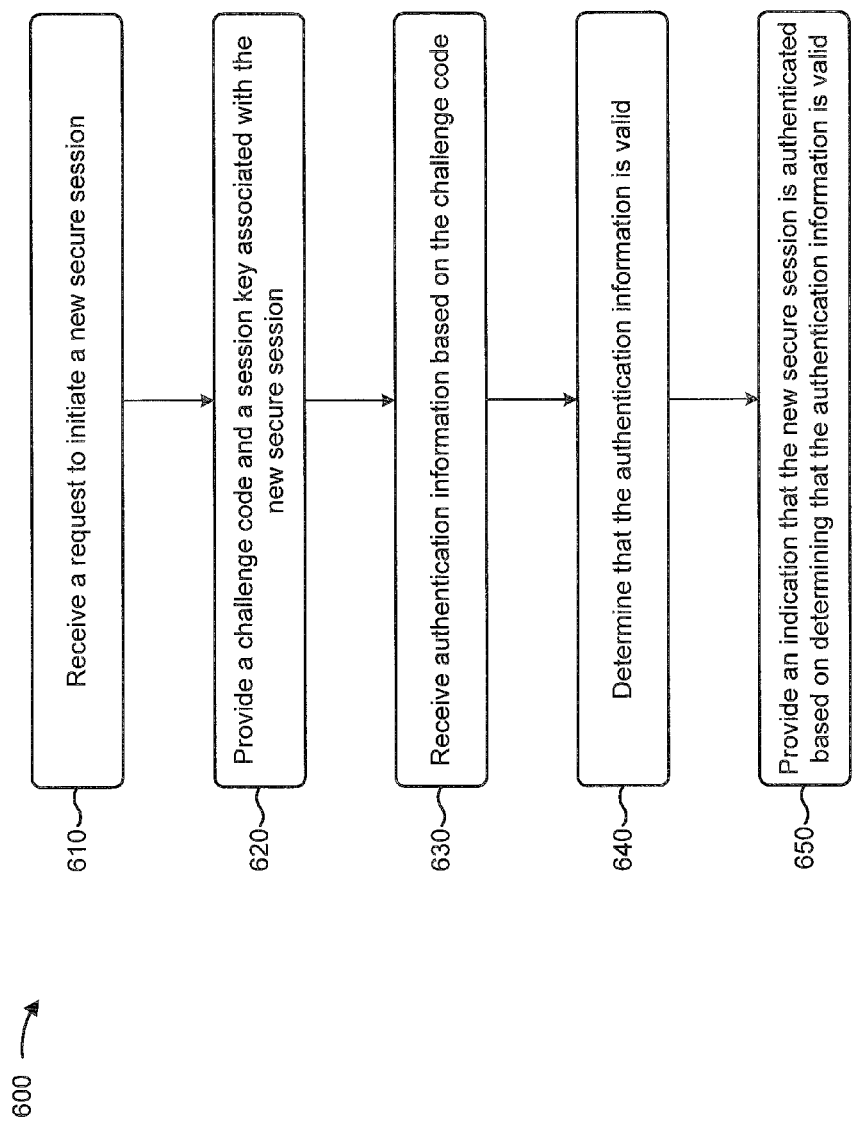

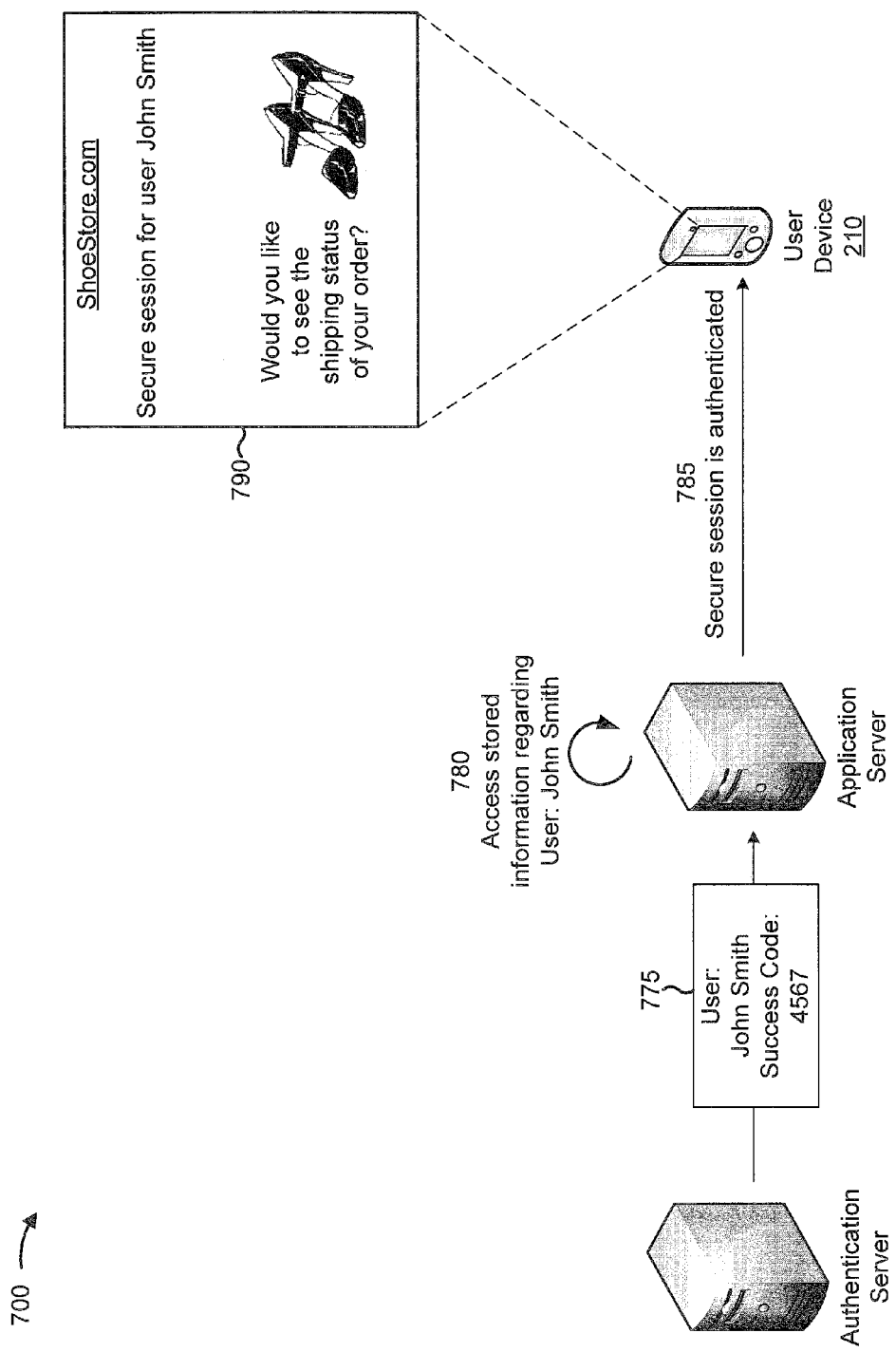

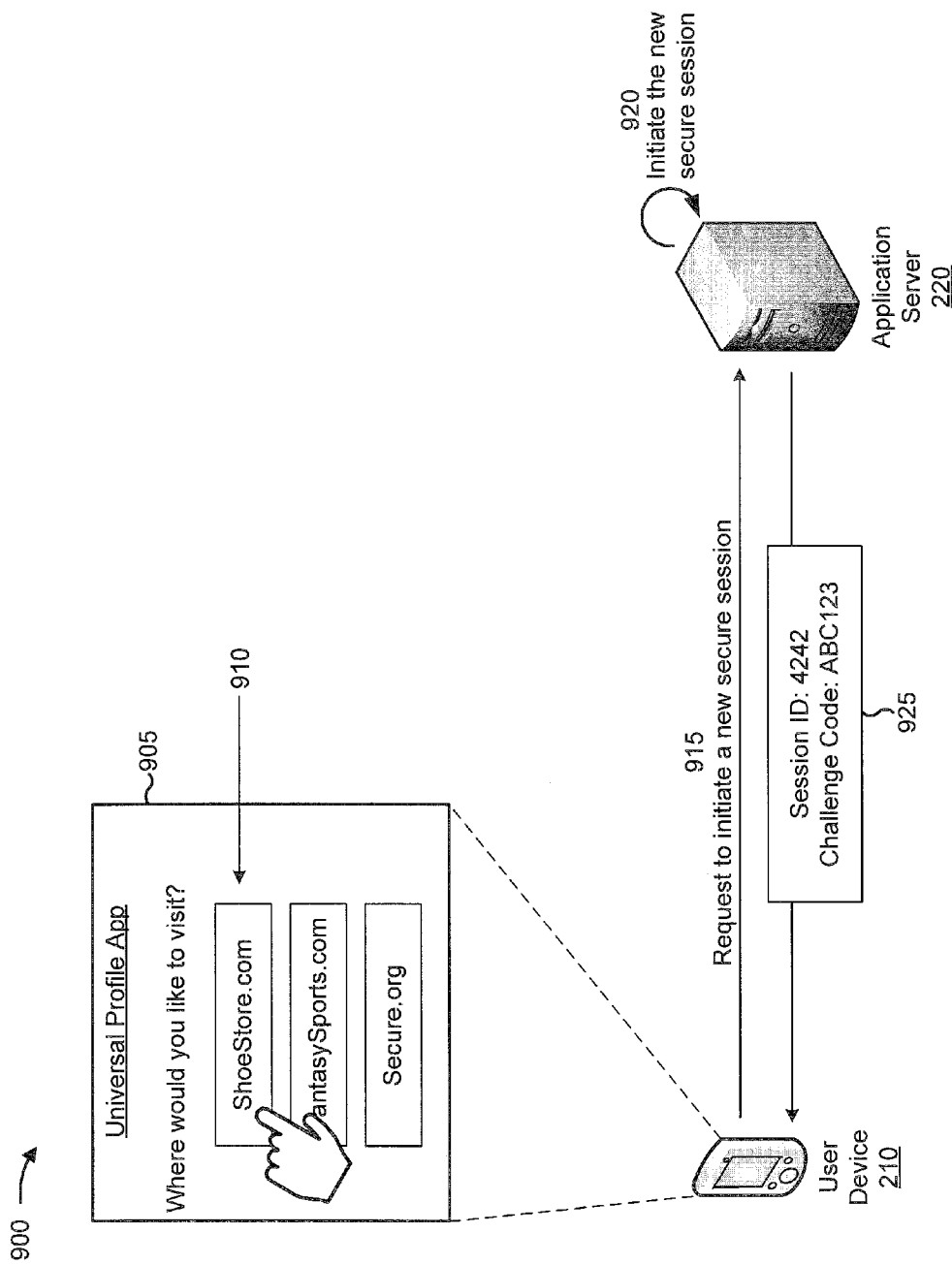

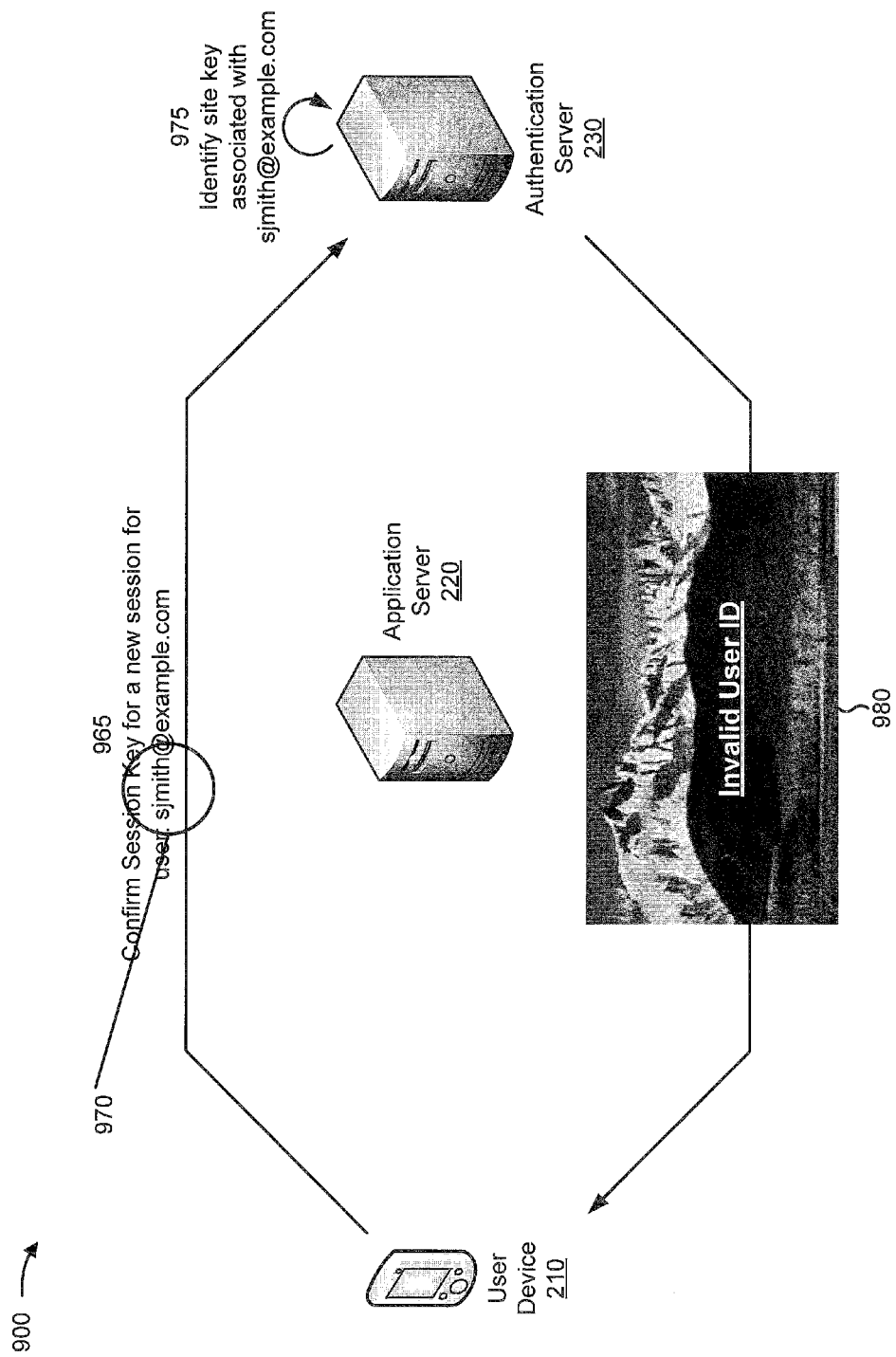

UNIVERSAL ANONYMOUS CROSS-SITE AUTHENTICATION

BACKGROUND

A web server may authenticate a user to utilize one or more features associated with a website. The user may provide a password, a user identifier, or the like for identification. The password may be associated with personal information regarding the user.

BRIEF DESCRIPTION OF THE DRAWINGS

FIGS. 5A and 5B are diagrams of an example implementation relating to the example process shown in FIG. 4;

FIG. 6 is a flow chart of an example process for anonymous cross-site authentication;

FIGS. 7A-7D are diagrams of an example implementation relating to the example process shown in FIG. 6;

FIGS. 9A-9D are diagrams of yet another example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

An application server associated with a website may permit a user to register a username and password for access to one or more features of the website. The application server may store personal information associated with the user as part of an authentication process. The application server may track information regarding the user's interactions with the website, such as previous purchases, favored aspects of the website, or the like. For multiple websites, the user may be required to register with multiple application servers associated with the multiple websites. However, a user may desire to access multiple websites with a single set of credentials, and may desire that the access be anonymous with respect to the user's personal information. Implementations described herein may utilize an authentication server to provide authentication for multiple websites without the user providing identification information to the multiple websites, while still permitting application servers associated with the multiple websites to store information regarding the user's utilization of the website.

Figure 1A:
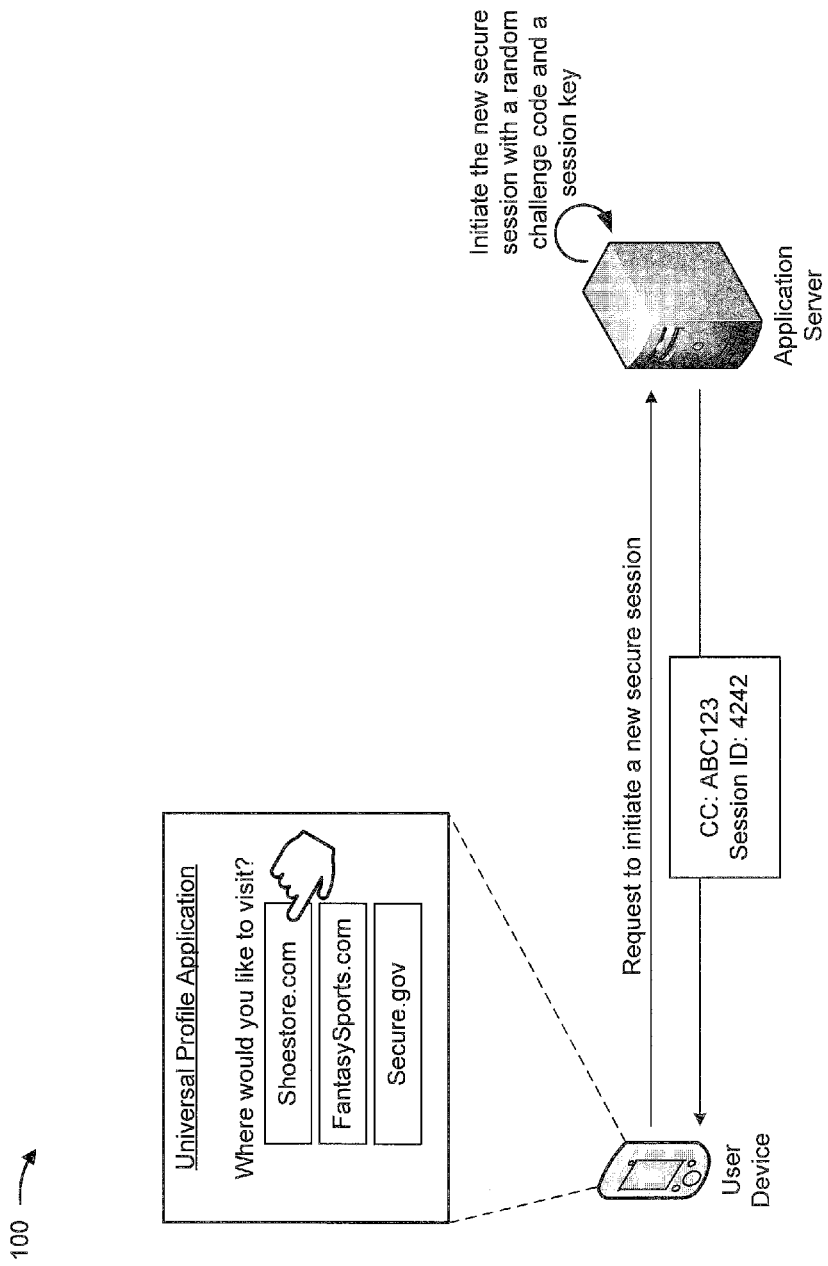
FIGS. 1A and 1B are diagrams of an overview of an example implementation described herein.
Figure 1B:
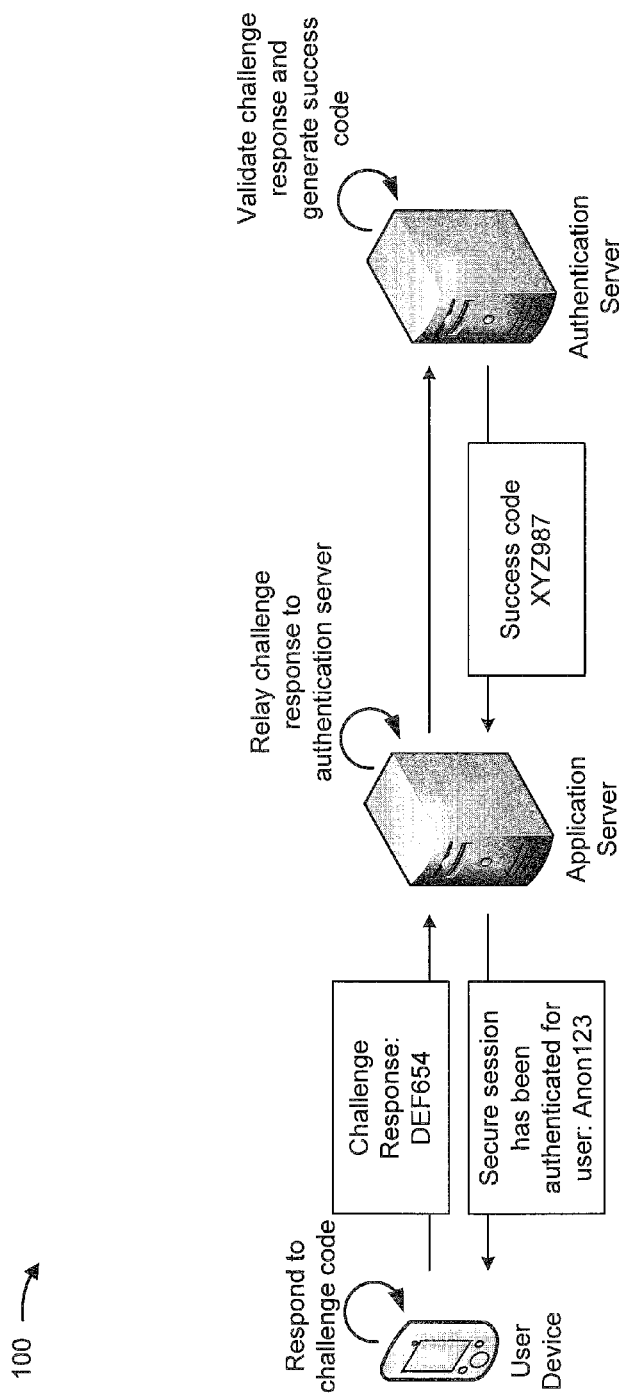

FIGS. 1A and 1B are diagrams of an overview of an example implementation 100 described herein. As shown in FIG. 1, a user may utilize a user interface associated with a user device to access a universal profile application. Assume that the user has already configured authentication with the universal profile application. Based on a user selection of a website, the user device may provide a request that an application server associated with the website initiate a new secure session (e.g., permit authenticated access to the website). For example, an application server associated with a particular website may receive a request that the new secure session be initiated to provide access to the particular website. The application server may initiate the new secure session, and may generate a challenge code (e.g., a random challenge code including a string of random characters, or the like) and a session key that identifies the new secure session. The application server may provide the challenge code and the session key to the user device.

As shown in FIG. 1B, the user device may determine a response to the challenge code based on stored information associated with responding to the challenge code. For example, the user device may sign the challenge code with a private certificate. Additionally, or alternatively, the user device may encrypt the challenge code with a symmetric key. The user device may provide information identifying the response to the challenge code to the application server, and the application server may relay the challenge response information to an authentication server. In some implementations, the authentication server may be a trusted party associated with multiple application servers, and each application server may be associated with a different website. The authentication server may validate the response to the challenge code against stored information determined during establishment of a profile for the user. In this way, the authentication server may determine that the user possesses credentials (e.g., a private key, a symmetric key, etc.) that were provided to the user during establishment of the profile, thereby indicating that the user is genuine. For example, the authentication server may validate a digital signature associated with the challenge code by checking a thumbprint (e.g., a public key fingerprint associated with a particular hash function) to identify a public key and validating the digital signature signed using an associated private key. Additionally, or alternatively, the authentication server may utilize a symmetric key to encrypt the challenge code and generate another response to the challenge code. In this case, the authentication server may match the response to the challenge code against the other response to the challenge code generated by the authentication server.

As further shown in FIG. 1B, the authentication server may, upon determining that the user is properly authenticated, provide a success code to the application server. The application server may configure the new secure session based on receiving the success code, and may provide an indication to the user that the new secure session has been authenticated. In some implementations, the application server may establish a profile for the user that is associated with an anonymous identifier generated by the authentication server. In this case, the application server may store information regarding the user's use of the website without having received other information that identifies the user. In some implementations, the user device may utilize a random image or code to provide information to the user indicating that the authentication server to be utilized is a genuine authentication server, and not an imposter authentication server. In some implementations, a particular user device may utilize another random image or code to provide information to the user indicating that a session that was established via another user device is the same session being accessed via the particular user device.

In this way, a user may log in to a website for an authenticated session without providing user information to the website. Furthermore, the website may authenticate the user based on receiving information indicating that the user is authenticated from an authentication server.

Figure 2:
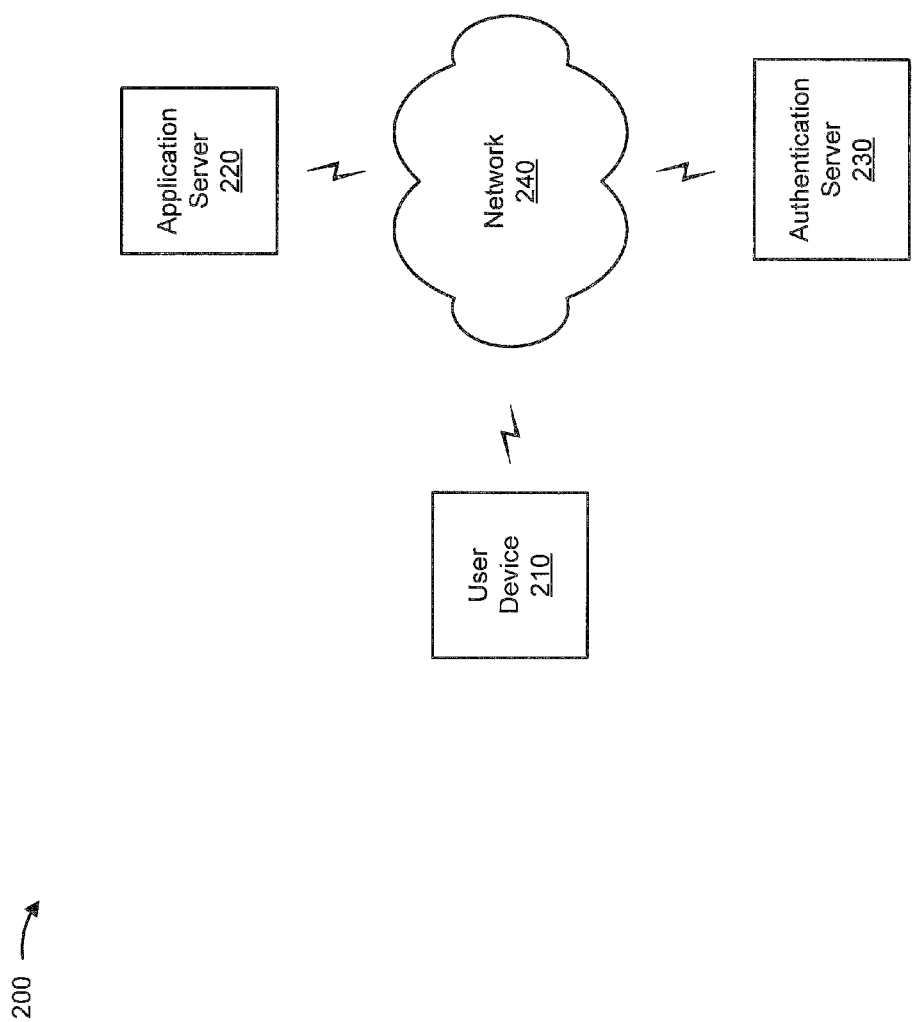
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an application server 220, an authentication server 230, and a network 240. Devices of environment 200 may interconnect via wired connections, wireless connections, or a combination of wired and wireless connections.

User device 210 may include a device capable of receiving, generating, storing, processing, and/or providing information associated with accessing a secure website. For example, user device 210 may include a communications and/or computing device, such as a mobile phone (e.g., a smart phone, a radiotelephone, etc.), a laptop computer, a tablet computer, a handheld computer, a gaming device, or a similar device. In some implementations, user device 210 may be configured to provide a cryptographic function, such as a private key encryption, a digital signature, a certificate, a symmetric key encryption, or the like. In some implementations, user device 210 may receive information from and/or transmit information to another device in environment 200.

Application server 220 may include one or more devices capable of storing, processing, and/or routing information associated with a website. In some implementations, application server 220 may include one or more functions capable of generating a challenge code that may be authenticated based on a digital signing certificate, a symmetric key, or the like. In some implementations, application server 220 may determine authentication server 230 to be a trusted third party, such that when authentication server 230 authenticates a user, application server 220 may establish a secure session for the user. In some implementations, application server 220 may include a communication interface that allows application server 220 to receive information from and/or transmit information to other devices in environment 200.

Authentication server 230 may include one or more devices capable of storing, processing, and/or routing information associated with authenticating a user. In some implementations, authentication server 230 may be associated with one or more data structures storing user information. For example, user device 210 may provide user information to authentication server 230, and may identify one or more websites associated with one or more application servers 220 to be accessed. In this case, authentication server 230 may provide information to the one or more application servers 220 indicating that the user has been authenticated. In some implementations, authentication server 230 may access information associated with authenticating a response to a challenge code that utilizes a private key, a digital signing certificate, a multi-factor authentication, a symmetric key, or the like. In some implementations, authentication server 230 may act as a trusted third party for application server 220. For example, when authentication server 230 determines that a user requesting a secure session has registered a user profile with authentication server 230 (e.g., confirms the user's identity), authentication server 230 may instruct application server 220 to establish a secure session for the user.

Network 240 may include one or more wired and/or wireless networks. For example, network 240 may include a cellular network (e.g., a long term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
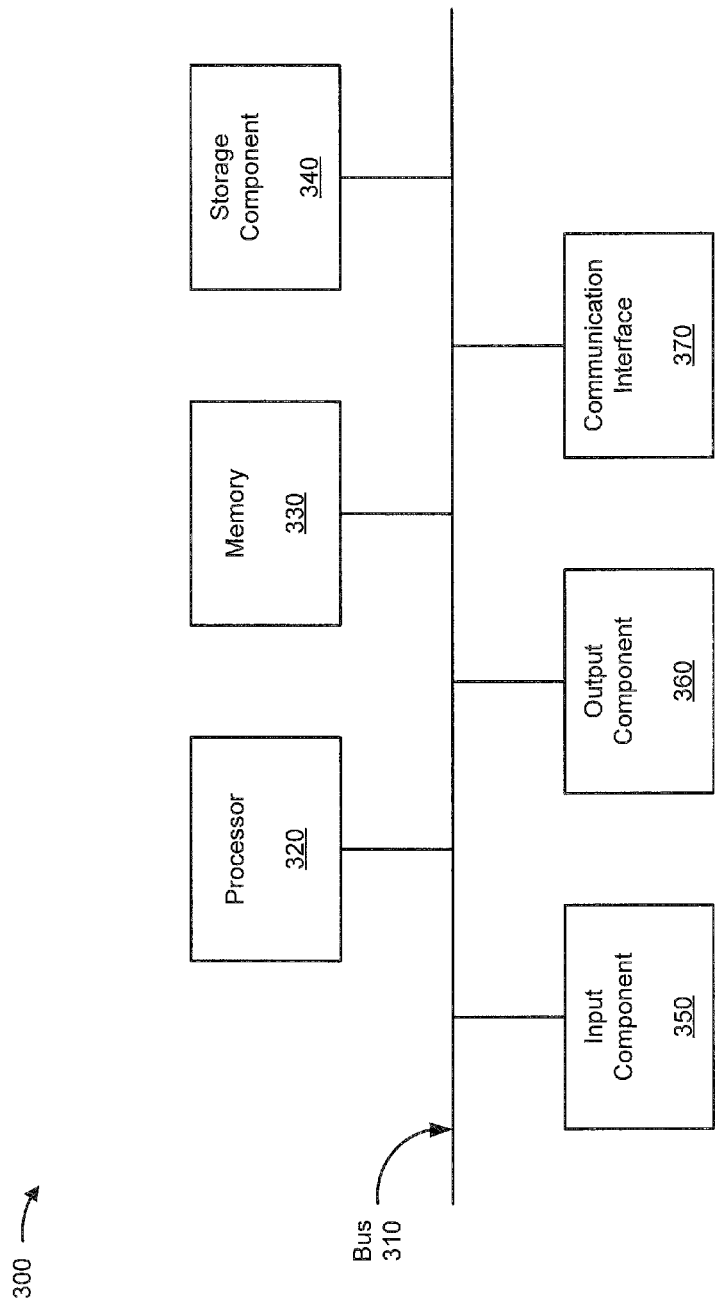
FIG. 3 is a diagram of example components of one or more devices of FIG. 2.

FIG. 3 is a diagram of example components of a device 300. Device 300 may correspond to user device 210, application server 220, and/or authentication server 230. In some implementations, user device 210, application server 220, and/or authentication server 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
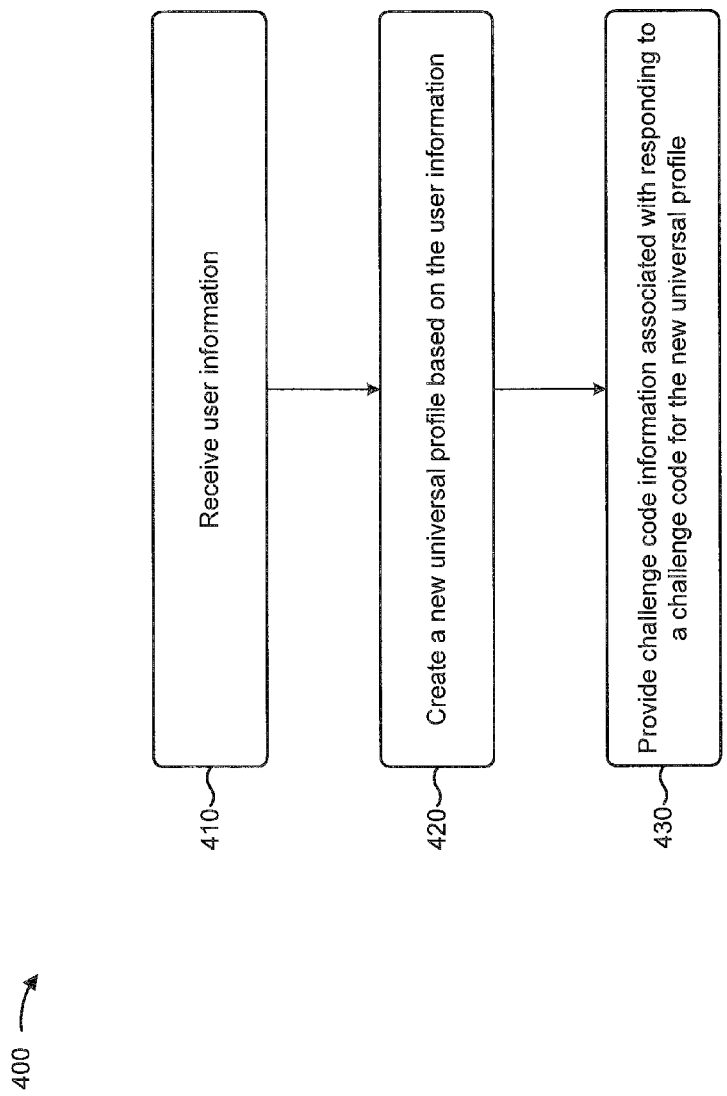
FIG. 4 is a flow chart of an example process for establishing a profile for anonymous cross-site authentication.

FIG. 4 is a flow chart of an example process 400 for establishing a profile for anonymous cross-site authentication. In some implementations, one or more process blocks of FIG. 4 may be performed by authentication server 230. Additionally, or alternatively, one or more process blocks of FIG. 4 may be performed by another device or a group of devices separate from or including authentication server 230, such as user device 210 and application server 220.

As shown in FIG. 4, process 400 may include receiving user information (block 410). For example, authentication server 230 may receive user information from user device 210 based on a user downloading and installing a universal profile application, on user device 210, that is associated with authentication server 230. User information may refer to information identifying a user name, a user identifier (e.g., a birth date, a social security number, a passport number, etc.), a user email address, a user phone number, a user address, an internet protocol (IP) address associated with user device 210, payment information identifying a credit card, or the like.

Authentication server 230 may require particular user information from user device 210, in some implementations. For example, authentication server 230 may indicate that user device 210 is to provide particular user information when providing user information. Additionally, or alternatively, authentication server 230 may permit user device 210 to provide user information based on a decision of the user. For example, the user may choose to provide only an email address, and may withhold other user information from authentication server 230.

Authentication server 230 may receive user information identifying a cryptographic capability associated with user device 210, in some implementations. For example, authentication server 230 may receive user information indicating that user device 210 may utilize a symmetric key encryption, a private key encryption, a digital certificate encryption, a multi-factor encryption, or the like.

Authentication server 230 may provide a visual confirmation indicating that a version of the universal profile application is genuine and has not been compromised by another party. For example, authentication server 230 may generate a visual site verification image, such as an image, a code, or the like, may associate the visual site verification image with a user profile being created for the user, and may provide the visual site verification image to the user for use in confirming that authentication server 230 is genuine when authentication server 230 is accessed to authenticate a secure session.

As further shown in FIG. 4, process 400 may include creating a new universal profile based on the user information (block 420). For example, authentication server 230 may create the new universal profile for the user. A universal profile may refer to stored information regarding the user that may be authenticated, such as a phone number, an email address, or the like. For example, a phone number for user device 210 may be authenticated by sending a message to the phone number including a response code, and receiving the response code in return. In this way, authentication server 230 may determine that user device 210, associated with the phone number, is being operated by a particular user that requested that user device 210 be authenticated. In some implementations, authentication server 230 may generate a universal profile identifier for the universal profile. For example, authentication server 230 may generate the universal profile identifier as a string of characters to be used in distinguishing the universal profile from other universal profiles stored in a data structure.

As further shown in FIG. 4, process 400 may include providing challenge code information associated with responding to a challenge code for the new universal profile (block 430). For example, authentication server 230 may provide, to user device 210, challenge code information associated with responding to the challenge code for the new universal profile. A challenge code may refer to information that is to be answered for authentication. For example, during authentication, application server 220 may provide a string of characters to be put through a cryptographic process by user device 210, and authentication server 230 may compare the result of the cryptographic process to an expected result to determine whether user device 210 possesses proper authentication credentials (e.g., a correct key associated with a particular hash function). Challenge code information may include information identifying one or more cryptographic processes to be applied to a challenge code when responding to a challenge code. For example, challenge code information may identify a key (e.g., a public key, a private key, a symmetric key, a digital certificate, a digital signature, etc.). In some implementations, authentication server 230 may provide the challenge code information via the universal profile application, and user device 210 may store the challenge code information via a secure repository. For example, user device 210 may store a private key, a symmetric key, or the like via a keychain program.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
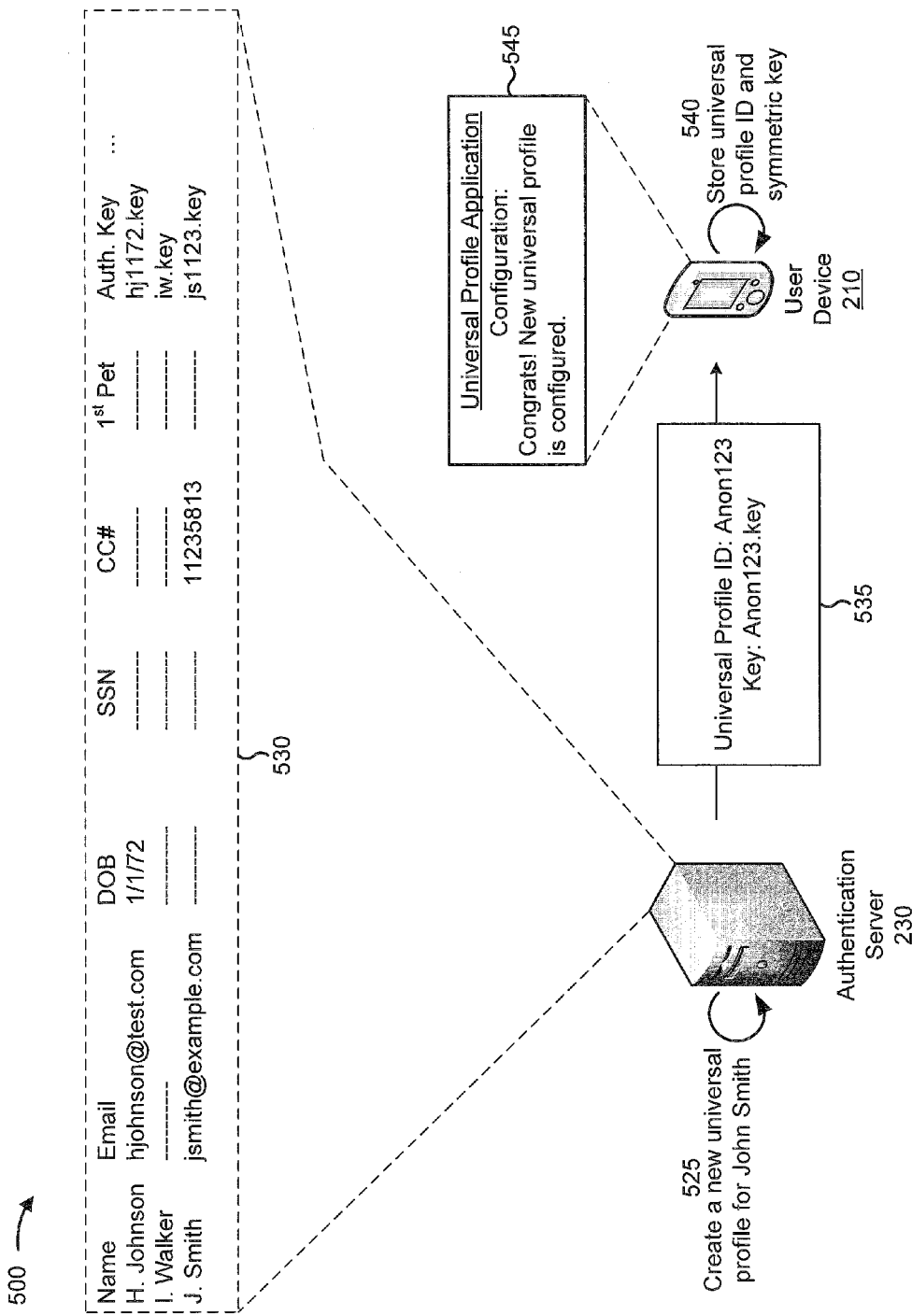

FIGS. 5A and 5B are diagrams of an example implementation 500 relating to example process 400 shown in FIG. 4. FIGS. 5A and 5B show an example of establishing a profile for anonymous cross-site authentication.

As shown in FIG. 5A, and by reference number 505, a user utilizes user device 210 to access a universal profile application (e.g., "Universal Profile App") that is associated with authentication server 230. As shown by reference number 510, the user provides optional user information, such as a name, an email address, and a credit card number. As shown by reference number 515, based on user interaction with a button, user device 210 provides user information associated with configuring a new universal profile with authentication server 230. As shown by reference number 520, authentication server receives a message requesting the new universal profile and indicating the user information that has been provided.

As shown in FIG. 5B, and by reference number 525, authentication server 230 creates the new universal profile for the user. As shown by reference number 530, authentication server 230 stores the user information, a universal profile identifier, and a symmetric key in a data structure that includes other universal profiles for other users. As shown by reference number 535, authentication server 230 provides information identifying the universal profile identifier for the user (e.g., "Anon123") and the symmetric key associated with responding to a challenge code. As shown by reference number 540, user device 210 stores the universal profile identifier and the symmetric key for use when accessing one or more websites associated with authentication server 230. As shown by reference number 545, user device 210 provides an indication that the new universal profile has been configured by authentication server 230.

As indicated above, FIGS. 5A and 5B are provided merely as an example. Other examples are possible and may differ from what was described with regard to FIGS. 5A and 5B.

FIG. 6 is a flow chart of an example process 600 for anonymous cross-site authentication. In some implementations, one or more process blocks of FIG. 6 may be performed by application server 220. In some implementations, one or more process blocks of FIG. 6 may be performed by another device or a group of devices separate from or including application server 220, such as user device 210 and authentication server 230.

As shown in FIG. 6, process 600 may include receiving a request to initiate a new secure session (block 610). For example, application server 220 may receive a request to initiate the new secure session from user device 210 (e.g., via a universal profile application). A secure session may refer to a secured information interchange between user device 210 and application server 220 (e.g., a website supported by application server 220). For example, a particular secure session may provide access to one or more private portions of a website, such as a billing portion, a classified portion, or the like. In some implementations, application server 220 may receive the request based on a user of user device 210 clicking on a link via the universal profile application, based on scanning a quick response (QR) code, based on inputting a network address, or the like. Additionally, or alternatively, application server 220 may provide, via a website, an offer to initiate the new secure session.

As further shown in FIG. 6, process 600 may include providing a challenge code and a session key associated with the new secure session (block 620). For example, application server 220 may generate the challenge code and the session key for the new secure session, and may provide the challenge code and the session key to user device 210. Additionally, or alternatively, authentication server 230 may generate the challenge code and/or the session key based on receiving information from application server 220, user device 210, or the like. The challenge code may refer to a string of characters to which a cryptographic process is to be applied and compared against an expected result. For example, application server 220 may provide a string of characters to user device 210 for user device 210 to encrypt via a symmetric key. The session key may refer to an identifier for the new secure session. For example, application server 220 may generate a particular session key for a particular session to permit access after an unexpected disconnection with user device 210.

As further shown in FIG. 6, process 600 may include receiving authentication information based on the challenge code (block 630). For example, application server 220 may receive authentication information identifying a response to the challenge code from user device 210. In this case, user device 210 may access information associated with responding to the challenge code that has been stored via a secure repository, such as a digital certificate, a private key, or the like. For example, when user device 210 has been provided with a private key from authentication server 230, user device 210 may sign the challenge code with the private key to generate authentication information. Additionally, or alternatively, when user device 210 has been provided with a symmetric key from authentication server 230, user device 210 may encrypt the challenge code using the symmetric key to generate authentication information.

In some implementations, application server 220 may receive authentication information based on user device 210 confirming that authentication server 230 is genuine. For example, user device 210 may provide information identifying the user to authentication server 230, and may receive a visual site verification image associated with a user profile for the user that was selected while configuring the user profile. In this way, the user may confirm that authentication server 230 is genuine, and user device 210 may provide authentication information based on confirming that authentication server 230 is genuine.

Additionally, or alternatively, when user device 210 provides incorrect information identifying the user (e.g., based on a user typo, or the like), authentication server 230 may generate a random image based on the incorrect information identifying the user, and may overlay information indicating that the incorrect information does not match any user. In this way, the user may see the overlaid information, and may determine that the random image is being provided because of a typo, not because of an imposter authentication server 230 lacking access to the correct image (e.g., the visual site verification image associated with the user's user profile). Furthermore, a compromised computing device attempting to automatically compromise authentication server 230 may be unable recognize the overlaid information, thereby preventing the compromised computing device from confirming whether the incorrect information identifies any user. Moreover, because the random image is generated based on the information incorrectly identifying the user (e.g., based on an algorithm, such as a hash function, or the like), authentication device 230 may generate the other random image whenever identical information incorrectly identifying the user (e.g., a user name, an email address, or the like) is provided, thereby preventing the compromised computing device from determining that the other image was generated randomly.

In some implementations, application server 220 may receive authentication information based on user device 210 confirming that application server 220 is genuine. For example, application server 220 may provide an indication of a session key (e.g., a session identifier) and information indicating that application server 220 is genuine (e.g., a digital certificate, or the like) to authentication server 230. In this case, authentication server 230 may provide information indicating that application server 220 is genuine to user device 210. In this case, user device 210 may provide the authentication information based on receiving the information indicating that application server 220 is genuine.

In some implementations, application server 220 may receive authentication information from another user device 210. For example, authentication server 230 may provide a message to user device 210 and to another user device 210 that includes a visual session verification image (e.g., a random image, code, or the like), and the user may provide authentication information via other user device 210 to authenticate the secure session for user device 210. In this way, the user may ensure that the secure session being authenticated via other user device 210 is the same secure session that was requested via user device 210 based on receiving the visual session verification image via user device 210 and other user device 210.

As further shown in FIG. 6, process 600 may include determining that the authentication information is valid (block 640). For example, application server 220 may determine that the authentication information is valid based on receiving information from authentication server 230. In some implementations, application server 220 may determine that the authentication information is valid based on authentication server 230 validating a private key signed certificate. For example, when user device 210 signs a challenge code with a private key, authentication server 230 may identify the user based on a user identifier, may identify a public key associated with a user profile for the user (e.g., established as described herein with respect to FIG. 4), and may verify the private key using the public key. In some implementations, application server 220 may determine that the authentication information is valid based on authentication server 230 validating a symmetric key. For example, when user device 210 encrypts the challenge code with a symmetric key, authentication server 230 may identify the user based on the user identifier, may retrieve a symmetric key associated with the user profile for the user, may encrypt the challenge code with the symmetric key, and may confirm that the encrypted challenge code provided by user device 210 matches the encrypted challenge code generated by authentication device 230. In this case, based on determining that user device 210 is utilizing the same cryptographic process as is associated with the user profile for the user (e.g., a private key that matches a public key, a symmetric key that matches another symmetric key, etc.), authentication device 230 may determine that the user requesting the secure session is the same user that registered the user profile (e.g., as described herein with respect to FIG. 4).

Application server 220 may receive a success code confirming that the user has been authenticated, in some implementations. For example, authentication server 230 may provide the success code to application server 220 to confirm that the user has been authenticated (e.g., confirming that the user has previously registered a user profile with authentication server 230). In some implementations, application server 220 may receive information identifying the user. For example, application server 220 may receive an anonymous user identifier generated by authentication server 230. In this way, the user of user device 210 may be authenticated for use of a website associated with application server 220, without providing personal information to application server 220. Additionally or alternatively, application server 220 may receive information identifying the user. In this way, a user of user device 210 may be provided non-anonymous authenticated access to the website associated with application server 220, without application server 220 having to store authentication information, and without the user having to register with the website for authentication.

Additionally, or alternatively, application server 220 may receive information indicating that the user has not been authenticated. In this case, application server 220 may provide information to user device 210 indicating that the user has not been authenticated, and may not provide the user with access to the secure session.

As further shown in FIG. 6, process 600 may include providing an indication that the new secure session is authenticated based on determining that the authentication information is valid (block 650). For example, application server 220 may provide the indication that the new secure session is authenticated. In some implementations, application server 220 may configure the secure session based on authenticating the secure session. For example, application server 220 may configure the secure session for the website to provide different information than an unsecure session, and user device 210 may provide the website for display with the different information. In some implementations, application server 220 may provide a notification that the secure session has been authenticated to user device 210. Additionally, or alternatively, application server 220 may receive a particular notification (e.g., a success code) from authentication server 230 indicating that the secure session is authenticated (e.g., based on authentication server 230 authenticating the user), and may provide the particular notification to user device 210.

Application server 220 may generate a profile based on an anonymous identifier, when providing information to the user. For example, application server 220 may receive the identifier associated with the user (e.g., a name, an anonymous identifier, a pseudonym, etc.) from authentication server 230, may generate a profile for storing user interactions with application server 220 (e.g., user interactions with a website associated with application server 220), and may provide an indication of the anonymous identifier to user device 210. Additionally, or alternatively, application server 220 may request user permission, when providing an indication that the secure session is authenticated, before establishing the identifier for tracking user interaction.

Application server 220 may provide the secure session to another user device 210, in some implementations. For example, application server 220 may determine that the secure session requested by first user device 210, is to be accessed via second user device 210 (e.g., based on a user request, based on a security parameter associated with the secure session, or the like), and may provide access to the secure session to second user device 210. In some implementations, application server 220 may utilize a visual session verification image (e.g., a random image or code associated with the session). For example, application server 220 may provide a random image to first user device 210, and may provide the same random image to second user device 210. In this way, the user may confirm that the session being accessed via second user device 210 is the same session requested via first user device 210.

Although FIG. 6 is described in terms of an application server 220 performing blocks of process 600, blocks of process 600 may also be performed by another device, such as authentication server 230. For example, authentication server 230 may receive a request to initiate a new secure session from user device 210, may provide a challenge code to user device 210, may receive authentication information from user device 210, may determine that the authentication information is valid, and may provide an indication that the new secure session is authenticated to application server 220. In this case, application server 220 may establish the new secure session based on receiving the indication that the new secure session is authenticated.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
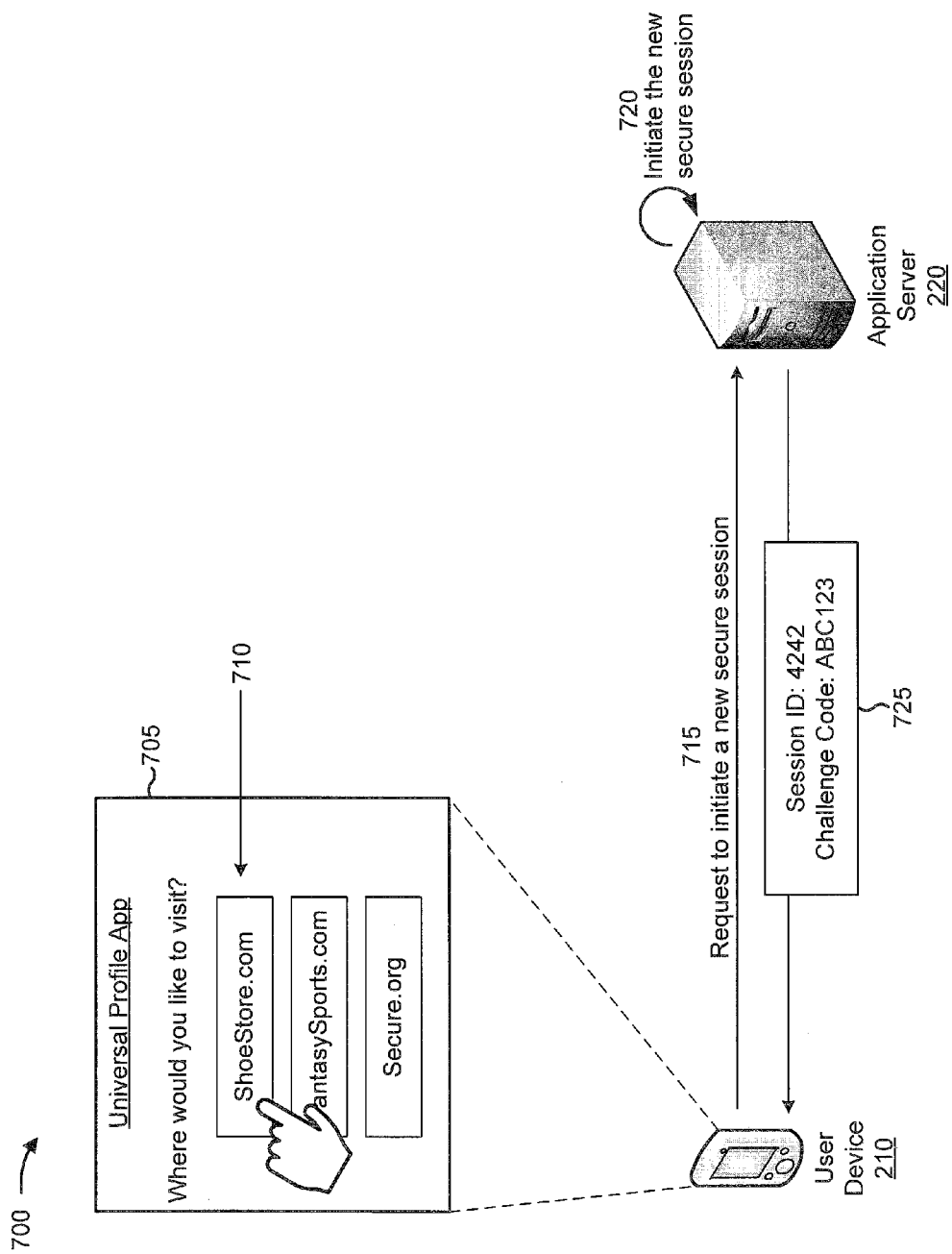
Figure 7B:
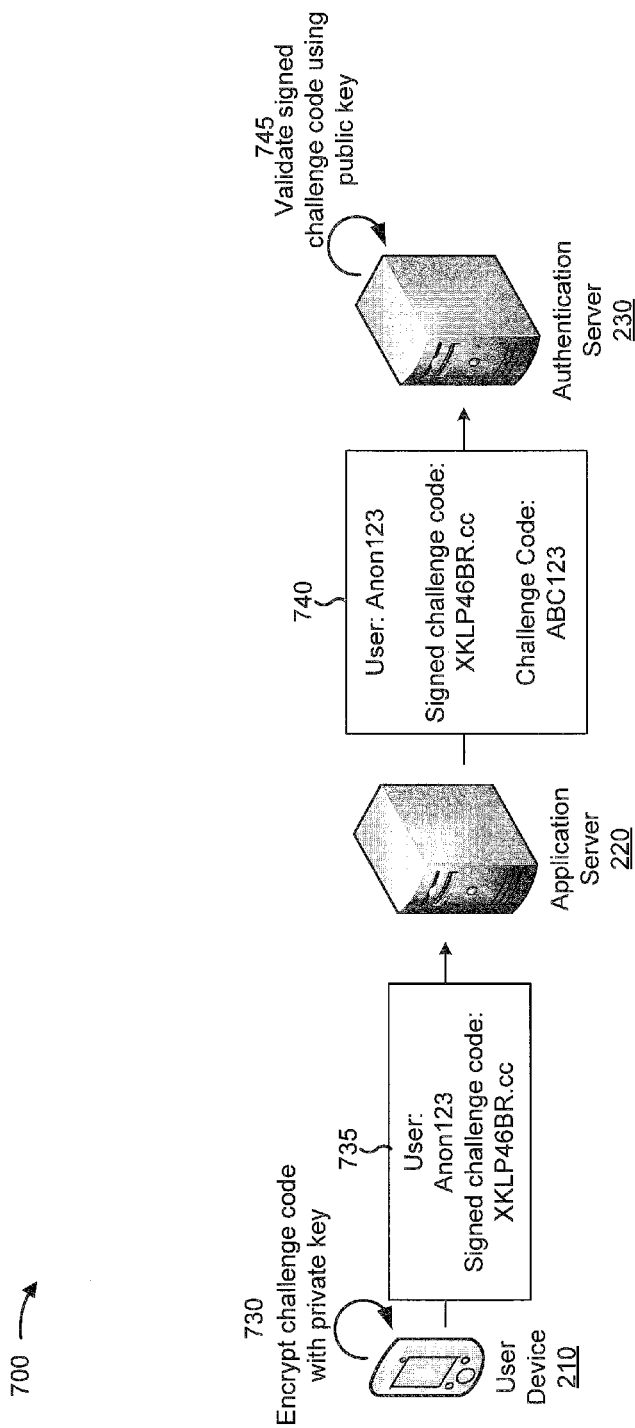
Figure 7C:
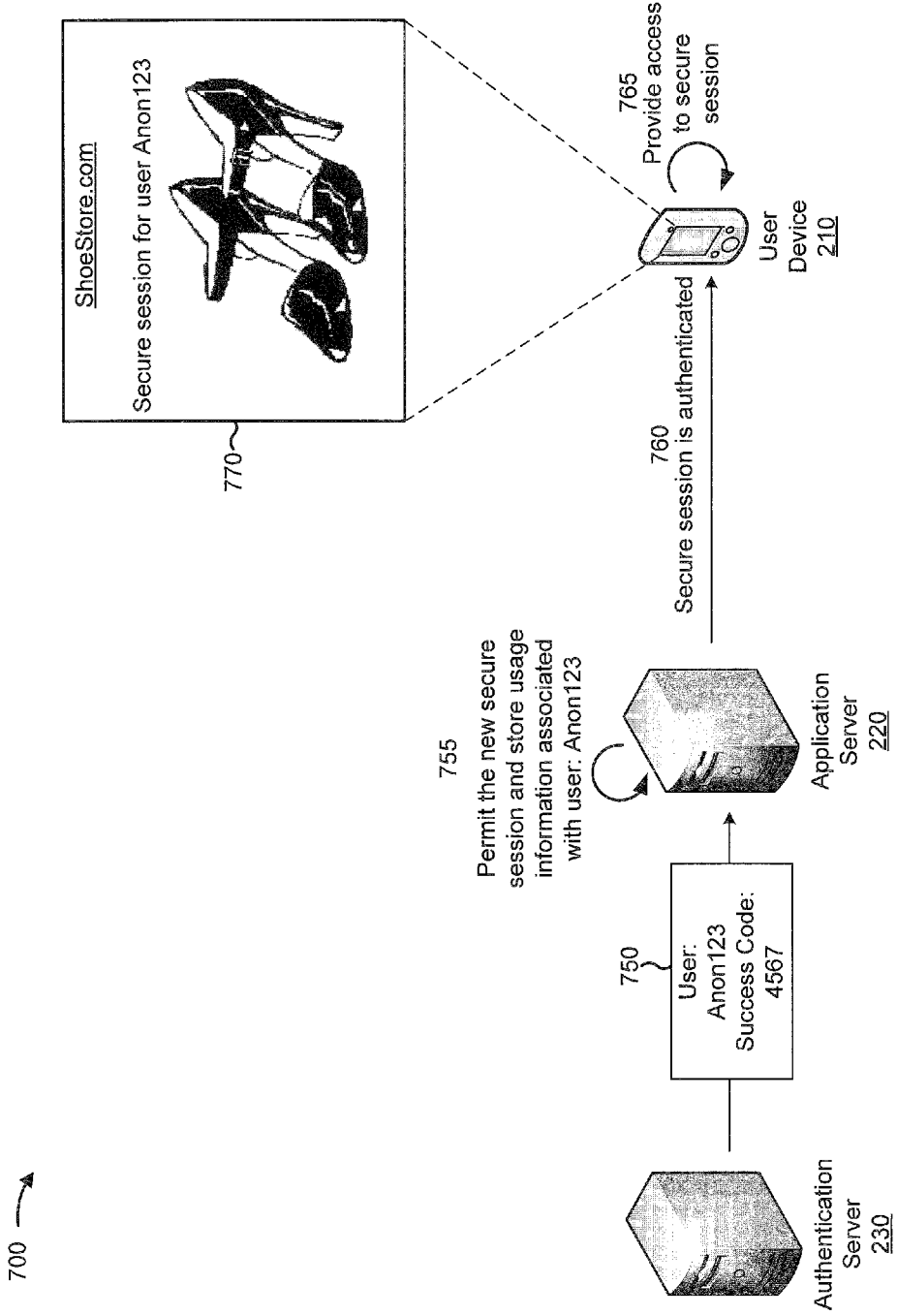

FIGS. 7A-7C are diagrams of an example implementation 700 relating to example process 600 shown in FIG. 6. FIGS. 7A-7C show an example of anonymous cross-site authentication.

As shown in FIG. 7A, and by reference number 705, a user of user device 210 may utilize a universal profile application. As shown by reference number 710, based on user interaction with a button, the user may select a particular website for anonymous authentication. As shown by reference number 715, user device 210 requests that application server 220 (e.g., a particular application server associated with the particular website) initiate a new secure session for the particular website. As shown by reference number 720, application server 220 initiates the secure session and, as shown by reference number 725, application server 220 provides, to user device 210, a session identifier, and a challenge code.

As shown in FIG. 7B, and by reference number 730, user device 210 encrypts the challenge code with a private key. As shown by reference number 735, user device 210 provides authentication information including an indication of an anonymous user identifier and the signed challenge code to application server 220. As shown by reference number 740, application server 220 relays the authentication information to authentication server 230. Assume that authentication server 230, determines that the private key was utilized to encrypt the challenge code, and accesses a public key for the user based on a public key fingerprint associated with the public key. As shown by reference number 745, authentication server 230 validates the signed challenge code utilizing the public key.

As shown in FIG. 7C, and by reference number 750, authentication server 230 provides information confirming that the user has been authenticated. The information includes the anonymous user identifier and a success code. As shown by reference number 755, application server 220 confirms the success code (e.g., determines that the success code matches an expected success code from authentication server 230) and permits the new secure session. As further shown by reference number 755, application server 220 stores usage information associated with the user based on the anonymous user identifier. As shown by reference number 760, application server 220 provides an indication that the new secure session is authenticated. As shown by reference number 765, user device 210 provides access to the secure session, and as shown by reference number 770, the user may utilize the secure session to visit the selected website. In this way, authentication server 230 may provide information to application server 220 indicating that a user has been authenticated, without revealing personal information regarding the user.

In another example, as shown in FIG. 7D, and by reference number 775, authentication server 230 provides information identifying the success code and identifying the user to application server 220. As shown by reference number 780, application server 220 accesses stored information regarding the user. As shown by reference number 785, application server 220 indicates that the new secure session is authenticated, and as shown by reference number 790, when the user accesses the website via the new secure session, the stored information regarding the user (e.g., a past purchase) may be provided. In this way, authentication server 230 may provide a non-anonymous authentication for a user, but may obviate the need for application server 220 to maintain authentication information for confirming an identity of the user.

As indicated above, FIGS. 7A-7D are provided merely as an example. Other examples are possible and may differ from what was described with regard to FIGS. 7A-7D.

Figure 8A:
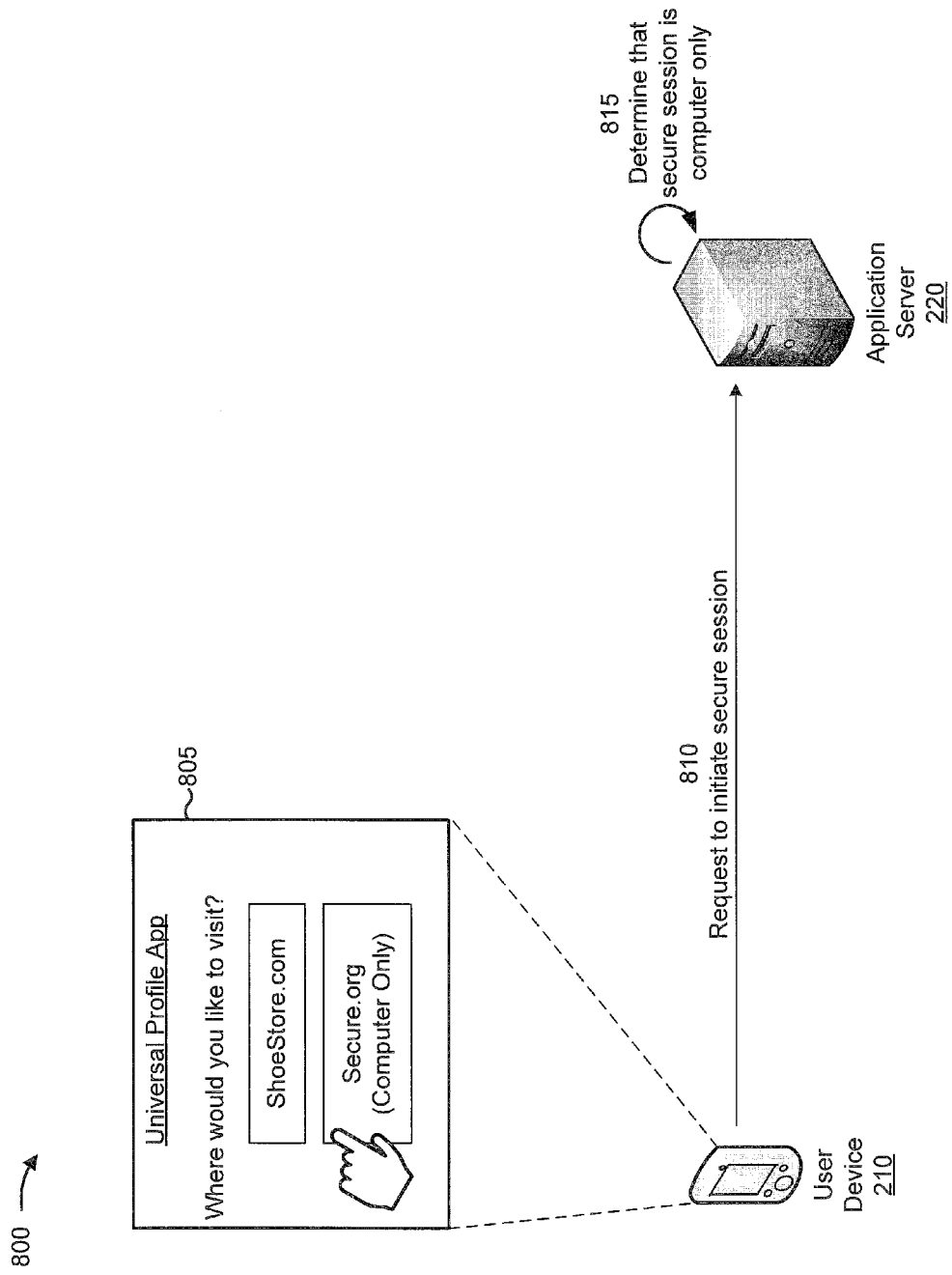
FIGS. 8A-8C are diagrams of another example implementation relating to the example process shown in FIG. 6.
Figure 8B:
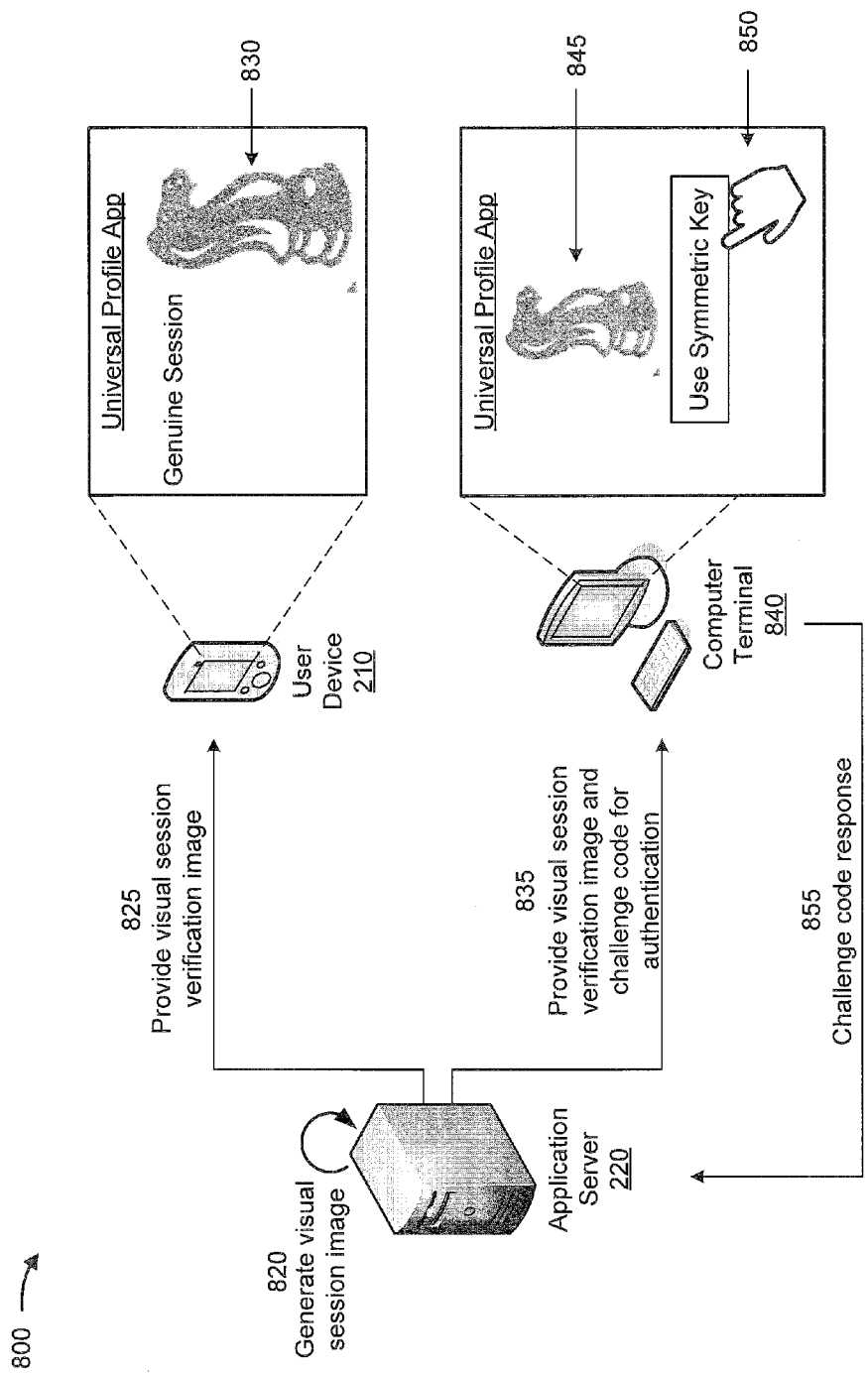
Figure 8C:
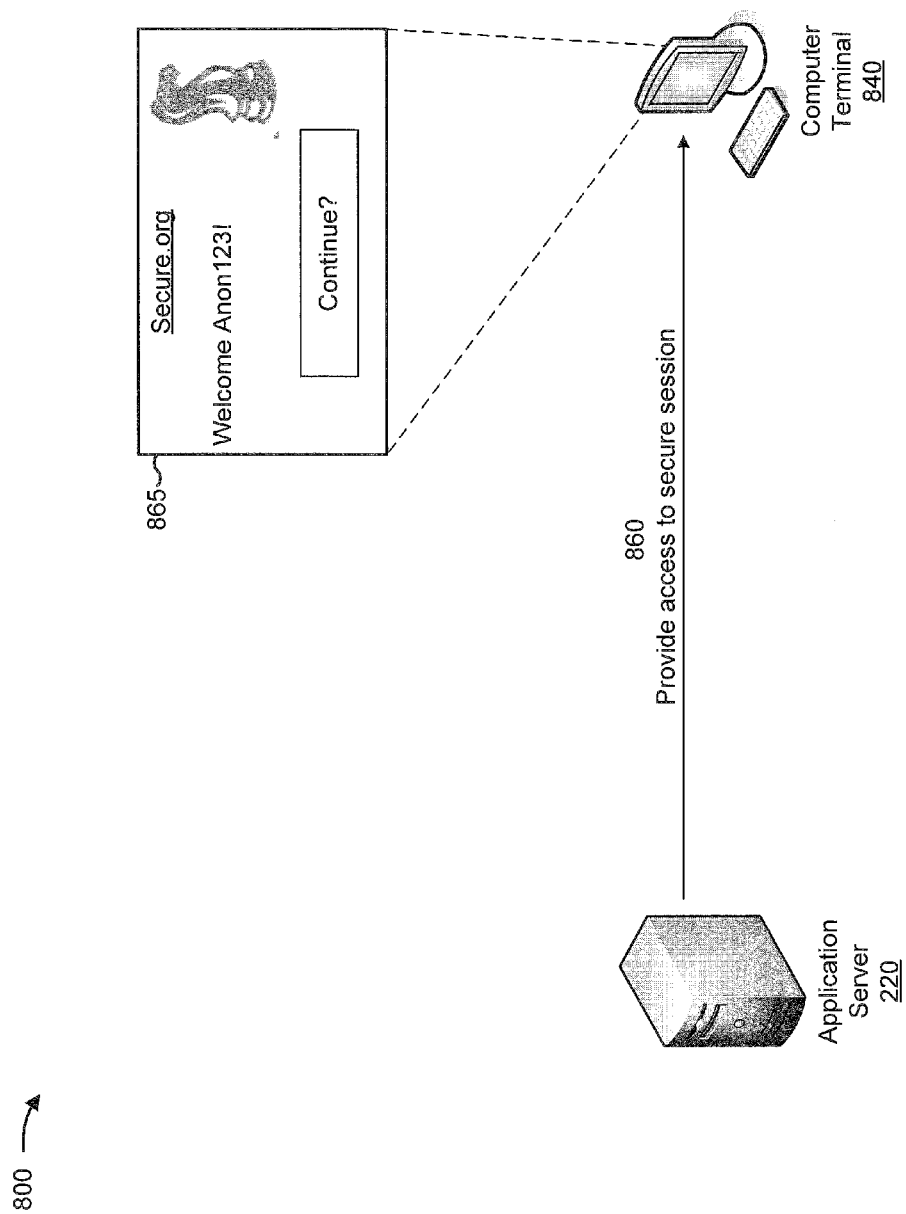

FIGS. 8A-8C are diagrams of an example implementation 800 relating to example process 600 shown in FIG. 6. FIGS. 8A-8C show an example of anonymous cross-site authentication.

As shown in FIG. 8A, and by reference number 805, based on a user interaction with a button, a user may select a particular website for anonymous authentication. Assume the website selected by the user may only be accessed using a computer, and not user device 210. As shown by reference number 810, user device 210 requests that application server 220 initiate a secure session for the website. As shown by reference number 815, application server 220 determines that the secure session may only be accessed using a computer, and that user device 210 is not a computer.

As shown in FIG. 8B, and by reference number 820, based on determining that the website cannot be accessed utilizing user device 210, application server 220 generates a visual session verification image in order to confirm to a computer that the secure session being provided is the secure session that was requested by user device 210. As shown by reference number 825, application server 220 provides the visual session verification image to user device 210. As shown by reference number 830, user device 210 displays the visual session verification image via a user interface. Assume that user device 210 has provided information associated with connecting application server 220 to a computer. As shown by reference number 835, application server 220 provides the visual session verification image and a challenge code for authentication to computer terminal 840. Assume that computer terminal 840 is permitted to access the website.

As further shown by FIG. 8B, and by reference number 845, computer terminal 840 displays the visual session verification image via another user interface. In this way, the user may confirm that the secure session being provided by application server 220 is genuine. As shown by reference number 850, based on the user confirming that the secure session is genuine by determining that the same visual session verification image is being displayed by user device 210 and computer terminal 840, the user may select a button to instruct computer terminal 840 to use a symmetric key to generate a challenge code response. As shown by reference number 855, application server 220 receives the challenge code response from computer terminal 840.

As shown in FIG. 8C, assume that application server 220 receives a success code indicating that the secure session is authenticated for the user. As shown by reference number 860, application server 220 provides access to the secure session to computer terminal 840. As shown by reference number 865, computer terminal 840 provides the user with access to the website via the secure session and displays the visual session verification image to confirm that the secure session is still genuine.

As indicated above, FIGS. 8A-8C are provided merely as an example. Other examples are possible and may differ from what was described with regard to FIGS. 8A-8C.

FIGS. 9A-9D are diagrams of an example implementation 900 relating to example process 600 shown in FIG. 6. FIGS. 9A-9D show an example of anonymous cross-site authentication.

As shown in FIG. 9A, and by reference number 905, a user of user device 210 may utilize a universal profile application. As shown by reference number 910, based on user interaction with a button, the user may select a particular website for anonymous authentication. As shown by reference number 915, user device 210 requests that application server 220 (e.g., a particular application server associated with the particular website) initiate a new secure session for the particular website. As shown by reference number 920, application server 220 initiates the secure session and, as shown by reference number 925, application server 220 provides, to user device 210, a session identifier, and a challenge code.

Figure 9B:
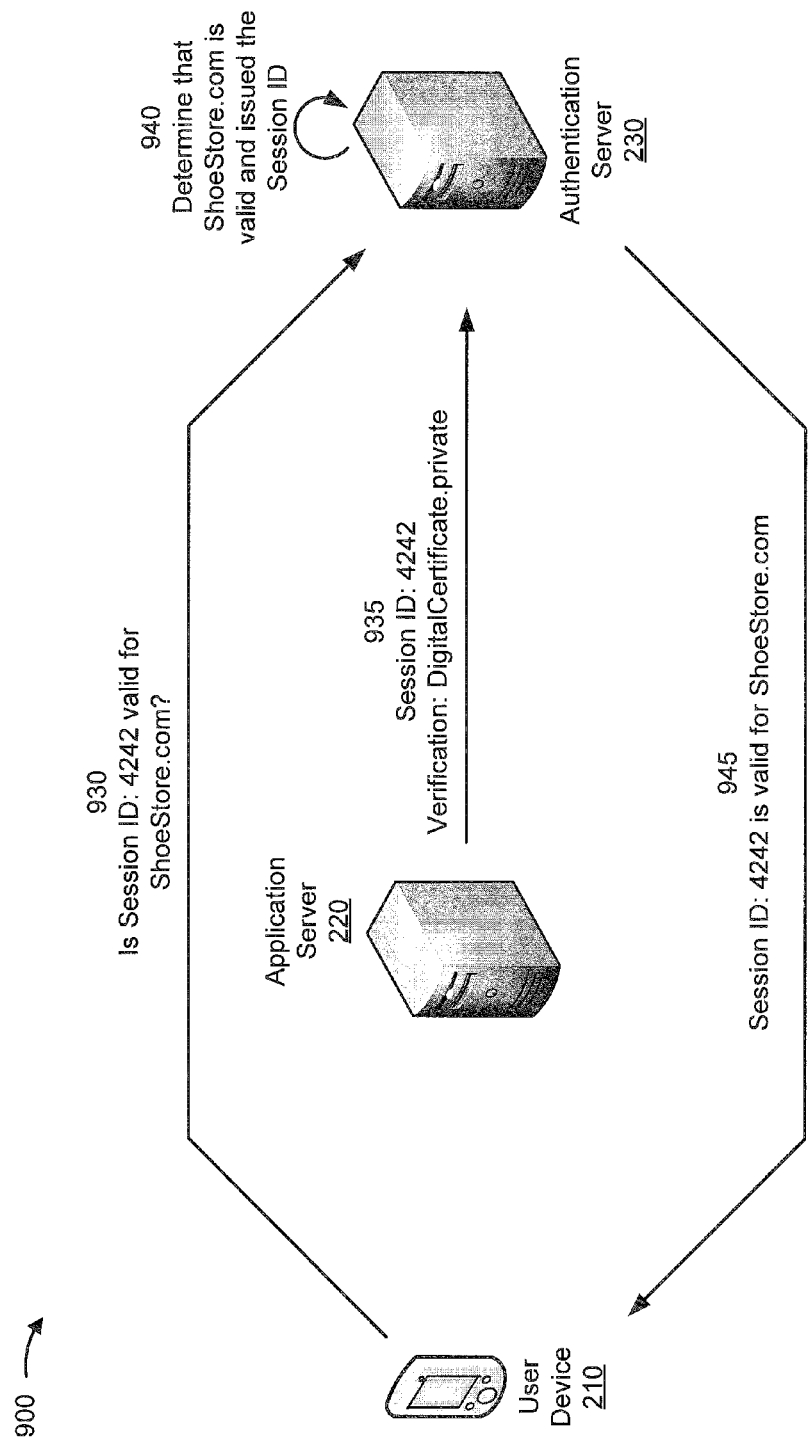

As shown in FIG. 9B, and by reference number 930, user device 210 requests information from authentication server 230 confirming that the secure session, identified by the session identifier, is genuine for the particular website (e.g., the user requests confirmation that application server 220 is genuine). As shown by reference number 935, application server 220 provides the session identifier and verification information (e.g., a digital certificate) to authentication server 230. As shown by reference number 940, authentication server matches the session identifier provided by user device 210 and the session identifier provided by application server 220, and confirms the verification information to determine that the secure session is being provided by a genuine application server 220. As shown by reference number 945, authentication server 230 provides an indication that application server 220 is genuine to user device 210. In this way, a user may ensure that application server 220 is genuine and not subject to a man in the middle attack from another application server 220 lacking proper verification information.

Figure 9C:
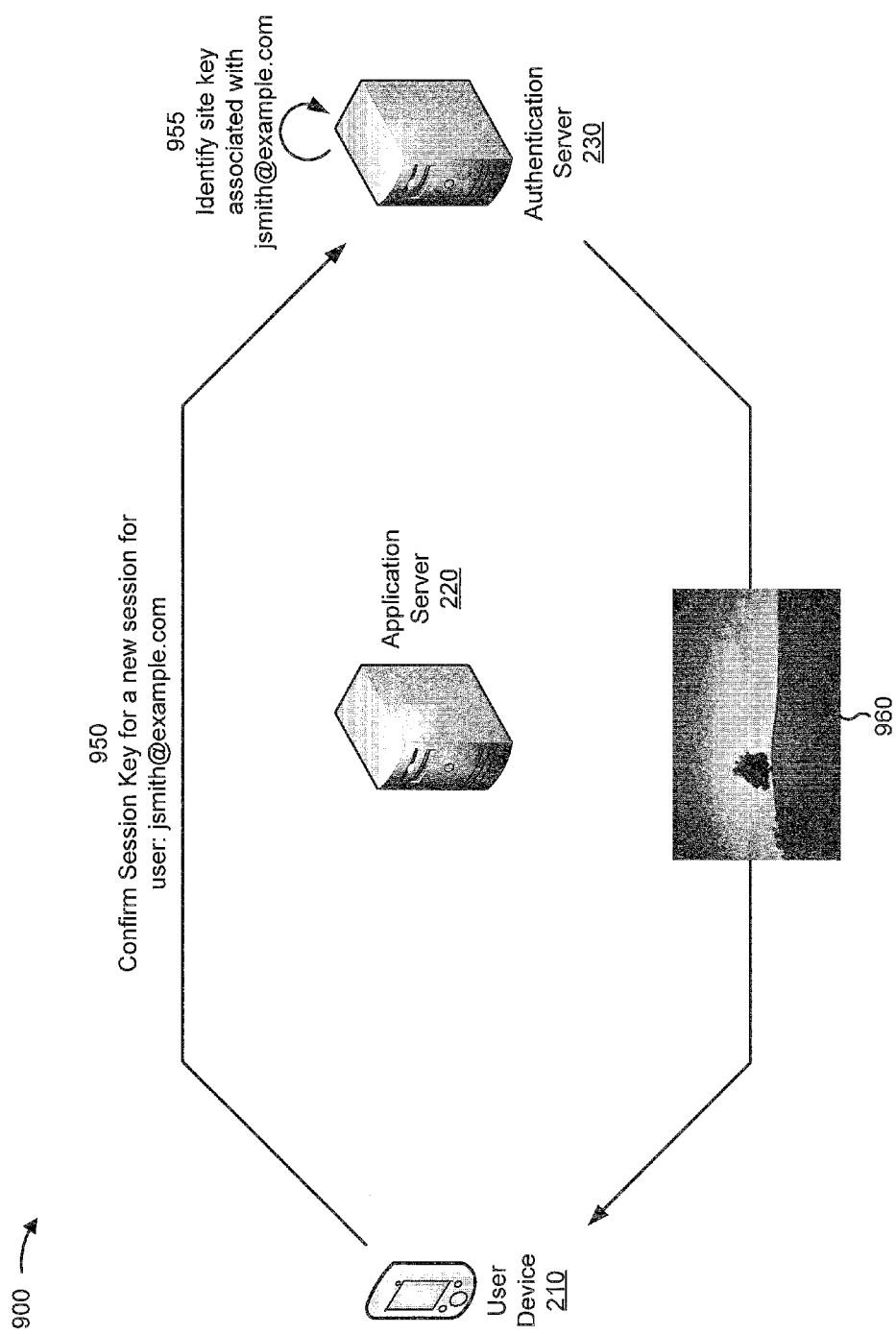

As shown in FIG. 9C, assume that the user has selected a visual site verification image to associate with a user profile. As shown by reference number 950, user device 210 requests that authentication server 230 provide the visual site verification image (e.g., a site key) determined based on information identifying the user (e.g., an email address). As shown by reference number 955, authentication server 230 identifies the visual site verification image associated with the information identifying the user. As shown by reference number 960, authentication server 230 provides the visual site verification image to user device 210, for the user to confirm. In this way, the user may determine that authentication server 230 is genuine (e.g., has access to user profile information that the user registered during user profile setup).

As shown in FIG. 9D, and by reference number 965, in another example, user device 210 requests that authentication server 230 provide the visual site verification image (e.g., a site key) determined based on information identifying the user (e.g., an email address). As shown by reference number 970, the information identifying the user is incorrect (e.g., includes a typo). As shown by reference number 975, authentication server 230 attempts to identify the visual site verification image associated with the incorrect information identifying the user. Assume that authentication server 230 cannot find a user profile matching the information provided by user device 210, and authentication server 230 generates another visual site verification image with an overlay indicating that the provided information is invalid. As shown by reference number 980, the other visual site verification image with the overlay is provided to user device 210 for review. In this way, when user device 210 merely provided information with a typo, the user may determine based on the overlay that the typo is the reason why the other visual site verification image was provided instead of the correct visual site verification image. Additionally, or alternatively, when user device 210 is attempting to confirm stolen user identification information automatically, user device 210 will be unable to identify the overlay and determine that the visual site verification image indicates that the user identification information is invalid, thereby frustrating attempts to utilize stolen user identification information.

As indicated above, FIGS. 9A-9D are provided merely as an example. Other examples are possible and may differ from what was described with regard to FIGS. 9A-9D.

In this way, a user may access a particular secure website anonymously by providing information to an authentication server that is subscribed to by multiple application servers associated with multiple websites, including the particular secure website. Furthermore, a single authentication server may perform authentications for multiple application servers, thereby eliminating the need for the multiple application servers to store authentication information and eliminating the need for the user to register with the multiple application servers.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory to store instructions; and
   one or more processors to execute the instructions to:
   receive user information associated with a user;
   generate, based on receiving the user information, a user profile for the user that stores the user information and authentication confirmation information,
      the authentication confirmation information including a public key associated with a private key, and
      the authentication confirmation information being associated with confirming that a received response to a challenge code generated using the public key matches an expected response generated using the private key;
   provide, based on generating the user profile, the private key to a user device of the user;
   receive, from an application server and based on providing the private key to the user device, a request to authenticate a secure session between the user device and the application server,
      the request including authentication information that includes a user identifier and a particular response to a particular challenge code;
   obtain, based on the user identifier and based on receiving the request to authenticate the secure session, the authentication confirmation information associated with the user from a data structure storing one or more user profiles;
   verify, based on obtaining the authentication confirmation information, a signature associated with the particular response to the particular challenge code utilizing the public key,
      the signature having been generated using the private key;
   validate, based on verifying the signature, the particular response to the particular challenge code using the public key; and
   provide, based on validating the particular response to the particular challenge code, information to the application server indicating that the secure session is authenticated for the user device to permit the application server to establish the secure session with the user device.

2. The device of claim 1, where the one or more processors are further to:
   generate a visual site identifier image; and
   cause the visual site identifier image to be displayed via a user interface being provided by the user device to the user.

3. The device of claim 1,
   where the one or more processors are further to:
      generate an anonymous identifier that does not uniquely identify the user; and
   where the one or more processors, when providing the information to the application server indicating that the secure session is authenticated for the user device, are to:
      provide the information to the application server without providing the user information identifying the user,
         the information including the anonymous identifier.

4. The device of claim 1,
   where the one or more processors are further to:
      identify a public key fingerprint being stored via the user profile; and
      determine the public key associated with validating the private key based on the public key fingerprint.

5. The device of claim 1, where the one or more processors, when providing information to the application server indicating that the secure session is validated for the user device, are to:
   provide information instructing the application server to establish the secure session for the user device; and
   provide information identifying the user associated with the user device.

6. The device of claim 1, where the particular challenge code comprises a string of characters.

7. The device of claim 1, where the one or more processors, when providing the information to the application server indicating that the secure session is authenticated for the user device, are to:
   provide a success code to the application server.

8. A non-transitory computer-readable medium storing instructions, the instructions comprising:
   one or more instructions that, when executed by one or more processors, cause the one or more processors to:
   receive a request from a user device to initiate a secure session associated with a particular provider,
      the user device having received authentication credentials from a server, the authentication credentials including a symmetric key;
provide, to the user device and based on receiving the request, a challenge code associated with the secure session and a session key identifying the secure session,
the challenge code comprising a string of characters, and
the user device processing the challenge code using the symmetric key;
receive, from the user device and based on providing the challenge code, authentication information responding to the challenge code;
provide, to the server and based on receiving the authentication information, the authentication information from the user device and the challenge code;
receive, from the server and based on providing the authentication information, a success code indicating that the authentication information is valid,
the success code identifying the secure session, and
the success code indicating that the string of characters has been processed by the symmetric key and matches an expected response generated by the server by processing the string of characters using the symmetric key; and
provide, to the user device and based on the receiving the success code, an indication that the secure session associated with the session key is authenticated based on receiving the success code.

9. The non-transitory computer-readable medium of claim 8,
where the one or more instructions, when executed by the one or more processors, further cause the one or more processors to:
provide information, to the server, indicating user information that is to be confirmed when validating the user device for the secure session; and
where the one or more instructions, that cause the one or more processors to receive the success code, cause the one or more processors to:
determine that the secure session is valid for the user device based on receiving the success code,
the success code indicating that the user information that is to be confirmed when validating users for secure sessions has been confirmed for the user and the secure session.

10. The non-transitory computer-readable medium of claim 8, where the one or more instructions, when executed by the one or more processors, further cause the one or more processors to:
determine, based on an anonymous identifier provided by the server, that a user associated with the user device has not previously accessed another secure session associated with the particular provider;
generate a user profile for the user based on the anonymous identifier,
the user profile including access information regarding accesses of a website of the particular provider by the user; and
store information regarding the secure session via the user profile.

11. The non-transitory computer-readable medium of claim 10, where the one or more instructions, when executed by the one or more processors, further cause the one or more processors to:
establish another secure session for the user device based on receiving another success code from the server,
the other success code including the anonymous identifier;
determine, based on the anonymous identifier, that the user has previously accessed another secure session associated with the particular provider;
identify the user profile associated with the user;
adjust the other secure session based on the access information; and
store information regarding the other secure session via the user profile.

12. The non-transitory computer-readable medium of claim 8, where the one or more instructions, that cause the one or more processors to provide the indication that the secure session is authenticated, cause the one or more processors to:
generate an identification token associated with identifying a user interface associated with the secure session and the particular provider as genuine; and
provide the identification token for display via the user interface to indicate that the secure session is genuine.

13. A method, comprising:
receiving, by a device from a user device, a request to initiate a secure session that is associated with a particular provider of multiple providers associated with providing secure sessions,
the user device having received cryptographic information associated with generating responses to challenge codes,
the cryptographic information including a cryptographic key;
identifying, by the device and based on receiving the request, a user of the user device based on an anonymous identifier and stored user information;
providing, by the device to the user device and based on identifying the user, a challenge code and a session key associated with the secure session,
the challenge code comprising a string of characters, and
the user device processing the challenge code using the cryptographic key;
receiving, by the device from the user device and based on providing the challenge code, authentication information including a response to the challenge code,
the authentication information being determined to be associated with the secure session based on the session key;
determining, by the device and based on receiving the authentication information, that the authentication information is valid without the particular provider being provided with access to the stored user information identifying the user,
the response to the challenge code having been determined to match an expected response to the challenge code determined based on other cryptographic information matching the cryptographic information,
the other cryptographic information including a function associated with the cryptographic key, and
the other cryptographic information having been determined based on identifying the user; and
providing, by the device and to the particular provider, an indication that the secure session is authenticated based on determining that the authentication information is valid without revealing the stored user information to the particular provider.

14. The method of claim 12, where determining that the authentication information is valid further comprises:
  providing the authentication information to a third party verification service associated with the multiple providers; and
  receiving, from the third party verification service and based on providing the authentication information, an indication that the authentication information is valid.

15. The method of claim 13, further comprising:
  receiving another request from the user device,
    the other request to establish a universal profile for the multiple providers;
  generating the cryptographic information, including the cryptographic key for the user to utilize in responding to challenge codes generated by the multiple providers;
  providing the cryptographic information to the user device;
  storing the other cryptographic information associated with identifying responses, performed using the cryptographic key, to challenge codes generated by the multiple providers as proper; and
  where determining that the authentication information is valid comprises:
    identifying the user;
    accessing, based on identifying the user, the stored other cryptographic information associated with identifying responses to challenge codes generated by the multiple providers as proper;
    determining a proper response to the challenge code based on the stored other cryptographic information; and
    determining that the authentication information is valid based on matching the proper response to the challenge code with the response to the challenge code.

16. The method of claim 13, further comprising:
  obtaining a site identification key associated with a user profile for the user;
  receiving, from the user device, information identifying the user; and
  providing information indicating that the device is genuine based on receiving the information identifying the user,
    the information indicating that the device is genuine including the site identification key.

17. The method of claim 13, further comprising:
  receiving, from the user device, incorrect information identifying the user,
    the incorrect information identifying the user not corresponding to a user profile;
  obtaining a site key associated with the incorrect information identifying the user,
    the site key overlaid with an indication of the incorrect information identifying the user on the site key; and
  providing the site key after overlaying the indication of the incorrect information identifying the user on the site key.

18. The non-transitory computer-readable medium of claim 8, where the one or more instructions, when executed by the one or more processors, further cause the one or more processors to:
  provide the secure session to another user device.

19. The method of claim 13, further comprising:
  providing the secure session to another user device.

20. The method of claim 13, further comprising:
  generating a visual site identifier image; and
  causing the visual site identifier image to be displayed via a user interface.

\* \* \* \* \*